(12) United States Patent
Roeland et al.

(10) Patent No.: US 9,392,636 B2
(45) Date of Patent: Jul. 12, 2016

(54) METHODS AND APPARATUSES FOR SETTING UP A PACKET DATA NETWORK (PDN) CONNECTION

(71) Applicant: Telefonaktiebolaget L M Ericsson (publ), Stockholm (SE)

(72) Inventors: Dinand Roeland, Sollentuna (SE); Zu Qiang, Kirkland (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 163 days.

(21) Appl. No.: 14/344,122

(22) PCT Filed: Sep. 19, 2012

(86) PCT No.: PCT/EP2012/068451
§ 371 (c)(1),
(2) Date: Mar. 11, 2014

(87) PCT Pub. No.: WO2013/041574
PCT Pub. Date: Mar. 28, 2013

(65) Prior Publication Data
US 2014/0341138 A1    Nov. 20, 2014

Related U.S. Application Data

(60) Provisional application No. 61/536,116, filed on Sep. 19, 2011.

(51) Int. Cl.
*H04W 76/02* (2009.01)
*H04W 80/04* (2009.01)
*H04L 29/12* (2006.01)

(52) U.S. Cl.
CPC ......... *H04W 80/045* (2013.01); *H04L 61/2015* (2013.01); *H04L 61/6086* (2013.01); *H04W 76/021* (2013.01); *H04W 76/022* (2013.01)

(58) Field of Classification Search
USPC ........................................................ 370/329
See application file for complete search history.

(56) References Cited

U.S. PATENT DOCUMENTS

| 2004/0004940 A1 | 1/2004 | Abrol et al. |
| 2009/0232022 A1 | 9/2009 | Savolainen et al. |
| 2010/0042714 A1* | 2/2010 | Choi ............... H04L 29/12301 709/223 |

(Continued)

OTHER PUBLICATIONS

3rd Generation Partnership Network, "3rd Generation Partnership Project; Technical Specification Group Services and System Aspects; Architecture enhancements for non-3GPP accesses (Release 11)", Technical Specification, 3GPP TS 23.402 V11.0.0, Sep. 1, 2011, pp. 1-237, 3GPP, France.*

(Continued)

*Primary Examiner* — Charles C Jiang
*Assistant Examiner* — Kyaw Z Soe
(74) *Attorney, Agent, or Firm* — Coats & Bennett, P.L.L.C.

(57) ABSTRACT

The application relates to IP address allocation. In certain contexts, the UE is not able or willing to indicate the IP capability it has. If there is a mismatch between the UE IP capability and the network assumption of that capability, extra resources may be allocated unnecessary. Embodiments include a non-3GPP gateway node that sends a message to a 3GPP gateway node including an indication that the PDN connection is to support a first and a second version of the Internet Protocol with allocation initially by the 3GPP gateway node of an IP address for the PDN connection of the first version but not the second version.

24 Claims, 11 Drawing Sheets

(56) References Cited

U.S. PATENT DOCUMENTS

| | | | |
|---|---|---|---|
| 2010/0142399 A1* | 6/2010 | Hu | H04W 36/0044 370/252 |
| 2010/0332625 A1 | 12/2010 | Wu et al. | |
| 2012/0008523 A1* | 1/2012 | Zhou | H04L 12/14 370/252 |
| 2013/0343269 A1* | 12/2013 | Evans | H04W 40/02 370/328 |
| 2014/0078967 A1* | 3/2014 | Turanyi | H04W 8/082 370/328 |

OTHER PUBLICATIONS

Broadband Forum, "WT-203 Interworking between Next Generation Fixed and 3GPP Wireless Access", Draft 8 bbf2009.1023, Revision: 09, Aug. 1, 2011, pp. 1-57.*

3rd Generation Partnership Network, "3rd Generation Partnership Project; Technical Specification Group Services and System Aspects; Architecture enhancements for non-3GPP accesses (Release 11)", Technical Specification, 3GPP TS 23.402 VI1.0.0, Sep. 1, 2011, pp. 1-237, 3GPP, France.*

Ali, A., et al., "Network-Based Mobility Management in the Evolved 3GPP Core Network", Article, IEEE Communications Magazine, Feb. 1, 2009, pp. 58-66, LTE-3GPP, Release 8, IEEE.

Ericsson, et al., "Optimized PDN Type for S2a attach with unmodified UE", SA WG2 Temporary Document, SA WG2 Meeting #88, Nov. 14, 2011, pp. 1-5, S2-114767, revision of 52-11xxxx.

Koodli, R., "Mobile Networks Considerations for IPV6 Deployment", v6ops Working Group Internet-Draft, May 19, 2011, pp. 1-20, IETF.

3rd Generation Partnership Network, "3rd Generation Partnership Project; Technical Specification Group Services and System Aspects; Study on Support of BBF Access Interworking (Release 11)", Technical Report, 3GPP TR 23.839 V1.2.0, Jul. 1, 2011, pp. 1-123, 3GPP, France.

3rd Generation Partnership Network, "3rd Generation Partnership Project; Technical Specification Group Services and System Aspects; Study on S2a Mobility based on GTP & WLAN access to EPC (SaMOG); Stage 2 (Release 11)", Technical Report, 3GPP TR 23.852 V0.3.0, Jul. 1, 2011, pp. 1-30, 3GPP, France.

3rd Generation Partnership Network, "3rd Generation Partnership Project; Technical Specification Group Services and System Aspects; Architecture enhancements for non-3GPP accesses (Release 10)", Technical Specification, 3GPP TS 23.402 V10.4.0, Jun. 1, 2011, pp. 1-231, 3GPP, France.

Broadband Forum, "WT-203 Interworking between Next Generation Fixed and 3GPP Wireless Access", Draft bbf2009.1023, Revision: 09, Aug. 1, 2011, pp. 1-57.

* cited by examiner

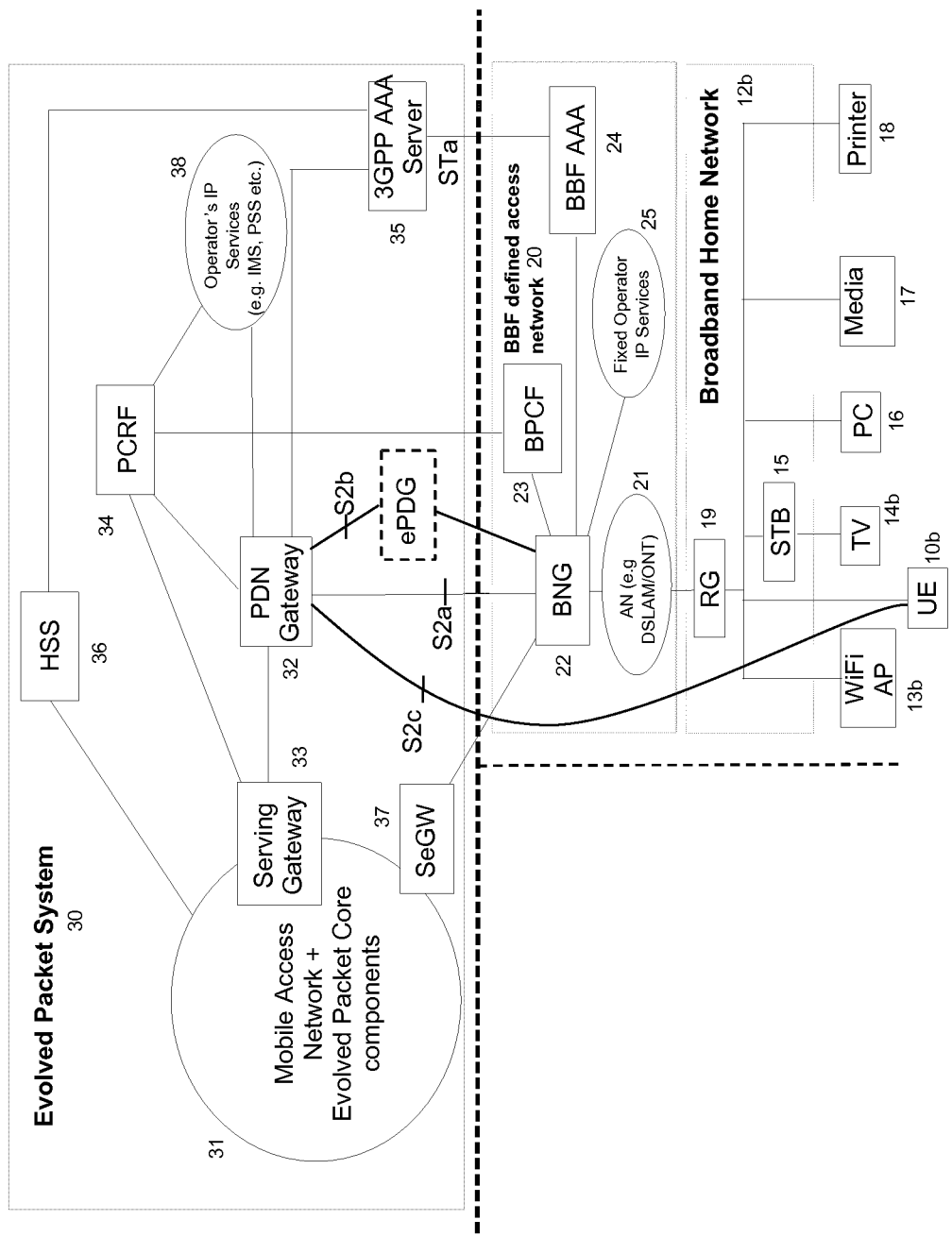

FIG. 6

| Octets | Bits | | | | | | | |
|---|---|---|---|---|---|---|---|---|
| | 8 | 7 | 6 | 5 | 4 | 3 | 2 | 1 |
| 1 | Type = xx (decimal) ||||||||
| 2 to 3 | Length = n ||||||||
| 4 | Spare |||| Instance ||||
| 5 | Postponed address allocation ||||||||
| 6 to (n+4) | These octet(s) is/are present only if explicitly specified ||||||||

FIG. 7

| Octets | Bits | | | | | | | |
|---|---|---|---|---|---|---|---|---|
| | 8 | 7 | 6 | 5 | 4 | 3 | 2 | 1 |
| 1 | Type = 19 ||||||||
| 2 | Length = n ||||||||
| 3 - 6 | Vendor Id = 10415 ||||||||
| 7 | Sub-Type = xx ||||||||
| 8 | Reserved中|||||||M |
| 9-n | Postponed address allocation ||||||||

FIG. 8

| Postponed address allocation value | Value |
|---|---|
| No Postponed address allocation | 0 |
| Postponed IPv4 address allocation | 1 |
| Postponed IPv6 address allocation | 2 |
| Spare | others |

FIG. 9

| Octets | Bits 8 7 6 5 4 3 2 1 |
|---|---|
| 1 | Type = xx (decimal) |
| 2 to 3 | Length = n |
| 4 | Spare \| Instance |
| 5 | PDN type Updating |
| 6 to (n+4) | These octet(s) is/are present only if explicitly specified |

FIG. 10

| Octets | Bits 8 7 6 5 4 3 2 1 |
|---|---|
| 1 | Type = 19 |
| 2 | Length = n |
| 3 - 6 | Vendor Id = 10415 |
| 7 | Sub-Type = xx |
| 8 | Reserved \| M |
| 9-n | PDN type Updating |

FIG. 11

| Postponed address allocation value | Value |
|---|---|
| PDN type Updating is requested | 0 |
| PDN type Updating is allowed | 1 |
| PDN type Updating is not allowed | 2 |
| PDN type Updating request for additional IPv4 address | 3 |
| PDN type Updating request for additional IPv6 prefix | 4 |
| Spare | others |

METHODS AND APPARATUSES FOR SETTING UP A PACKET DATA NETWORK (PDN) CONNECTION

TECHNICAL FIELD

The present invention relates to a method and apparatus relating to a scheme in which a mobile terminal is connected to a 3GPP core network (or equivalent) via a non-3GPP (or equivalent) access network. The method finds particular use in Fixed Mobile Convergence.

BACKGROUND

The Third Generation Project Partnership (3GPP) has developed the System Architecture Evolution (SAE) as the core network architecture of its future and Long Term Evolution (LTE) wireless mobile telecommunications standard. The main component of the SAE architecture is the Evolved Packet Core (EPC). The LTE/SAE network includes network entities supporting the user and control planes.

An ongoing trend within telecommunications is the convergence of fixed and mobile networks, which is known as Fixed Mobile Convergence (FMC). The trend of evolving networks towards the use of IP-based technologies is common to both fixed and mobile networks, which makes the convergence easier. Through FMC, mobile and fixed network operators will be able to utilize their network resource more efficiently, which leads to reduction of capital and operational expenditure. For instance, when a user is running an IP-based application such as Multimedia Telephony (MMTel) inside their home, it is more efficient to utilize broadband connectivity of the fixed access network rather than the wireless access network.

Residential networks have been important to the success of FMC because they are the most commonly used fixed network access by ordinary users. Therefore, it is important to be able to connect mobile phones to the Evolved Packet Core (EPC) through a residential network. Note that the term User Equipment (UE) is used interchangeably herein in place of the term mobile phone or mobile terminal. The term UE is used throughout the 3rd Generation Partnership Project (3GPP) documentation, and is intended to refer to any piece of equipment that is configured to access the internet; it would include, for example and without limitation, mobile telecommunication devices, portable or handheld computing devices and desktop or installed computers. However, for the purposes of this disclosure and the inventive techniques described herein, the term is not necessarily limited to devices that support 3GPP standards.

3GPP defines mobile 2G/3G/LTE accesses and "non-3GPP accesses." See 3GPP TS 23.402, "3rd Generation Partnership Project; Technical Specification Group Services and System Aspects; Architecture enhancements for non-3GPP accesses". The latter, non-3GPP accesses can include access through a fixed network. The BroadBand Forum (BBF) is a standardization organization developing standards for fixed access (see http://www.broadband-forum.org/) and defines an architecture for fixed networks. There is an ongoing joint work item on FMC between these two organizations [3GPP TR 23.839, now moving into TS 23.139, and BBF WT 203].

Many UEs address the FMC trend by providing multiple radio interfaces: one interface to connect to a 2G/3G/LTE access and a WiFi interface to connect to a fixed network.

3GPP TS 23.402 defines different ways for a UE to connect to the 3GPP core network (EPC) via a non-3GPP access network. In particular, there are several ways defined to attach a 3GPP UE via a BBF domain. 3GPP defines four access procedures: (trusted) S2a, (untrusted) S2b, trusted S2c, untrusted S2c; these can more generally be considered as three access procedures S2a, S2b and S2c.

These are shown in FIG. 1 of the accompanying drawings, which illustrates the key entities and network paths involved between a UE 10b and a mobile access network with EPC components 31. As illustrated in FIG. 1, UE 10b connects to a Broadband network, in this example a Broadband Home Network 12b, and then via a BBF-defined access network 20 to the Evolved Packet System 30. Also shown are other equipment entities that connect to the Broadband Home Network 12b, such as a WiFi Access Point (AP) 13b, a TV 14b with set-top box 15, a personal computer 16, a Media centre 17 and a printer 18. The WiFi access domain could be, e.g., a residential network or an operator provided hotspot.

A Residential Gateway (RG) 19 in the Broadband Home Network 12b connects to an access node (AN) 21 in the BBF-defined access network 20, which in turn connects to a Border Network Gateway (BNG) 22. In certain configurations, the Residential Gateway (RG) 19 and WiFi Access Point (AP) 13b might be co-located in the same physical device. Other entities in the BBF-defined access network 20 that connect to the BNG 22 include a Broadband, or BBF, Policy Control Function (BPCF) 23, a BBF Authorisation and Accounting server (BBF AAA) 24 and other fixed operator services 25.

In the Evolved Packet System 30 is a PDN Gateway (PDN-GW) 32, to which user data packets are sent by one of the three methods S2a, S2b, S2c. In addition, the Evolved Packet System 30 includes the mobile access network with EPC components 31, accessed via a Serving Gateway 33, a Policy and Charging Rules Function (PCRF) 34, a 3GPP Authorisation and Accounting server (3GPP AAA) 35, a user's Home Subscriber Server (HSS) 36, a Security Gateway (SeGW) 37 and other entities 38 for the Operator-provided IP services. For some accesses an Evolved Packet Data Gateway (ePDG) may be provided between the PDN-GW 32 and the external gateway node (in this case the BNG 22).

A 3GPP UE can attach to a BBF access network and connect to one or more PDNs via the S2 interface [3GPP TS 23.402]. Each PDN connection is anchored in a 3GPP PGW. The UE receives one IP address for each PDN connection. It is the PDN-GW (PGW) that assigns the address.

Of the three basic types of S2 interface, S2b and S2c overlay the BBF network and do not impact BBF. S2a is a more converged solution that does impact BBF nodes.

In S2a, there is a GPRS Tunneling Protocol (GTP) or Proxy Mobile IP (PMIP) tunnel for each PDN connection between the BBF BNG and the 3GPP PGW(s). Between the UE and the BNG a point-to-point link is required in order to separate the traffic from the different PDN connections. Such a point-to-point link can be implemented in several ways. One strategy to implement this point-to-point link is illustrated in FIG. 2A of the accompanying drawings. A UE 2 connects to a 3GPP domain 4 via a BBF Domain 6. The BBF Domain 6 comprises a Residential Gateway (RG) 8, an Access Node (AN) 10 and a BNG 12. The 3GPP domain 4 comprises one or more PDN Gateways (PGWs) 14.

An assumption can be made that the network between the UE and BNG is Ethernet-based. All nodes between the UE and the BNG do forced-forwarding towards the BNG on Layer 2 (L2; Ethernet). The BNG always sends downstream traffic targeted for the UE as unicast on L2, even if that traffic is multicast/broadcast on Layer 3 (L3; IP).

Such an implementation imposes a limited impact on the UE and the existing BBF infrastructure. More importantly, there is no impact to the UE if the UE only has one default PDN connection. The BNG can distinguish the different PDN connections based on the UE MAC address combined with the PDN connection IP address that was assigned to the UE.

It is to be noted that there are other ways to implement a point-to-point link between the UE and the BNG. Examples are: a L3 tunnel (e.g. IPsec or IP-in-IP), a L2 tunnel (e.g. L2TP), etc. However, all of these have a bigger impact on the UE or the BBF infrastructure.

Additional standardization activities are ongoing in the WiFi Alliance. In the WiFi Alliance, one of the focus areas is (public) hotspots. Therefore, in addition to the residential networks described above, hotspots are increasingly becoming key to the success of FMC, and there is a work item in 3GPP called SaMOG (Study on S2a mobility based on GTP & WLAN access to EPC; see 3GPP TR 23.852 at http://www.3gpp.org/ftp/Specs/html-info/23852.htm).

SaMOG is specific to S2a, but not specific to BBF. In S2a, the non-3GPP access network is seen as trusted; the non-3GPP access network is therefore denoted as TNAN (Trusted Non-3GPP Access Network). Where the TNAN uses Wireless LAN (WLAN) as the radio technology towards the UEs, the TNAN is denoted as TWAN (Trusted WLAN Access Network).

S2a over TWAN is now standardized in 3GPP [Chapter 16 of 3GPP TS 23.402]. FIG. 2B of the accompanying drawings is a schematic block diagram providing an architecture overview, illustrating a UE 2 connecting to a 3GPP domain 4 via a TWAN 6. The TWAN 6 comprises a Residential Gateway (RG) 8, an Access Node (AN) 10 and a gateway node denoted as a TWAN Access Gateway (TWAG) 12. The 3GPP domain 4 comprises one or more PDN Gateways (PGWs) 14. Also shown in FIG. 2B is a Trusted WLAN Access Point (TWAP), of which the BBF AAA 24 of FIG. 1 is an example; this will be described in more detail below.

In S2a, there is a GPRS Tunnelling Protocol (GTP) or Proxy Mobile IP (PMIP) tunnel for each PDN connection between the TWAG 12 (e.g. a BBF Border Network Gateway (BNG)) in the TWAN 6 and the 3GPP PGW(s). Each PDN connection is anchored in a 3GPP PGW. The UE receives one IP address for each PDN connection, and it is the PGW that assigns the address. Similarly, between the UE 2 and the TWAG 12 a point-to-point link is provided in order to separate the traffic from the different UEs and PDN connections.

A point-to-point link can be considered to be a protocol that provides a logical direct connection between two networking nodes. A data frame sent from node A via a point-to-point link to node B will not pass a node C. Note that a "point-to-point link" is a logical concept and can be implemented in several ways. The network between the UE 2 and the TWAG 12 would generally be Ethernet based, and examples of a point-to-point link between the UE 2 and TWAG 12 are: a L3 tunnel (e.g. IPsec or IP-in-IP), and a L2 tunnel (e.g. L2TP); however the technique disclosed herein is applicable to any data link layer or delivery protocol as will become apparent.

The correspondence between FIG. 2A and FIG. 2B will be clear. Note that the TWAG may also be standalone, such that there could be one BNG node and another TWAG node. The TWAG would then be above the BNG. The TWAG terminates the S2a interface.

SUMMARY

A method is proposed here relating to the connecting of a mobile terminal or UE to a 3GPP core network, such as the Evolved Packet Core, via a non-3GPP access network, such as a BBF network or domain. The method finds use in a Fixed Mobile Convergence scheme, where the mobile terminal or UE connects to the 3GPP core network through a fixed residential network, for example using WiFi.

A UE can attach to a non-3GPP access network and connect to one or more PDNs via a 3GPP network. Each PDN connection is anchored in a gateway node in the 3GPP network (such as a PDN Gateway or PGW), and in a gateway node in the non-3GPP access network (such as a border gateway node or BGW; in the case where a BBF network is the non-3GPP access network, the BGW might be a BNG). A separate tunnel is established for each such PDN connection between the gateway node (e.g. BNG) in the non-3GPP access network and the gateway node (e.g. PGW) in the 3GPP network.

The UE receives an IP address for each PDN connection. In this respect, a PDN connection can be considered to be an association between an UE and a PDN, represented for example by one IPv4 address and/or one IPv6 prefix. It is the gateway node (e.g. PGW) in the 3GPP network that assigns the address. A PDN is identified by an Access Point Name (APN) and a PDN is accessed via the PGW.

A mechanism is proposed herein in which either a dual stack (or dual IP) PDN type (i.e. IPv4v6) is allocated at initial PDN connection setup, or a single PDN type (i.e. IPv4 or IPv6) is allocated at initial PDN connection setup with the PDN connection type change request is indicated if an additional IP address allocation request is received from the same UE for the same APN.

The current 3GPP TS 23.402 has a deferred IPv4 address allocation procedure, but it is only applicable when the UE is attaching to a 3GPP access. It also requires the UE to send a deferred IPv4 address allocation indicator in the Protocol Configuration Option (PCO) Information Element (IE) at PDN connection setup procedure, which is not possible for BBF interworking where there is a requirement for no impact on the UE.

The UE attaches to the non-3GPP access network. Access Authentication is performed, and is accepted. The UE has a predetermined IP capability which reflects which (one or both) of first and second versions the Internet Protocol (IP) it supports (is able to operate). The first and second IP versions may be IPv4 and IPv6 respectively, or vice versa. However, the first and/or second version of IP may be some other (e.g. later or even earlier) version of IP.

For example in view of limitations of the non-3GPP access network and/or limitations in the protocols supported by the UE, the UE is unable to communicate its IP capability over the non-3GPP access network to the relevant nodes. The mechanism proposed herein is not limited to a scenario (e.g. for BBF interworking) in which there is a requirement for no impact on the UE; there may be other reasons why the UE is unable or chooses not to communicate its IP capability over the non-3GPP access network to the relevant nodes.

The UE sends a triggering message (e.g. a PDN connection triggering or request message) to the gateway node in the non-3GPP access network (e.g. BNG), which is received by the gateway node (e.g. BNG). For brevity, the gateway node in the non-3GPP access network (e.g. BNG) will be referred to as the non-3GPP gateway node (e.g. BNG).

In response to receipt of the triggering message, the non-3GPP gateway node (e.g. BNG) initiates a tunnel setup procedure (e.g. GTP or PMIP) with the gateway node in the 3GPP network (e.g. PGW), in order to establish a tunnel between the non-3GPP gateway node (e.g. BNG) and the gateway node in the 3GPP network (e.g. PGW), where the tunnel is associated with a PDN connection between the UE and a PDN. For brevity, the gateway node in the 3GPP network (e.g. PGW) will be referred to as the 3GPP gateway node (e.g. PGW).

The triggering message is associated with the first IP version. For example, where the first and second IP versions are IPv4 and IPv6 respectively, the triggering message is an IPv4 triggering message (e.g. DHCPv4 request message; DHCP is the Dynamic Host Configuration Protocol). Where the first and second IP versions are IPv6 and IPv4 respectively, the triggering message is an IPv6 triggering message (e.g. DHCPv6 request message or RS message).

As part of the tunnel setup procedure or separately, the non-3GPP gateway node (e.g. BNG) sends a message (e.g. PDN connection request) to the 3GPP gateway node (e.g. PGW) including an indication of the PDN type (or PDN connection type). The PDN type is indicated in the message either (A) as being one which supports both the first and second IP versions (e.g. a multiple or dual stack or dual IP type IPv4v6); or (B) as being one which supports the first IP version (e.g. a single IP type IPv4 or IPv6).

In the same or a different message from the non-3GPP gateway node (e.g. BNG) to the 3GPP gateway node (e.g. PGW), the non-3GPP gateway node (e.g. BNG) also includes an indication either (A) that a postponed (rather than immediate) allocation of an IP address of the second version is requested; or (B) that a later allocation of an IP address of the second version may be requested, thereby requiring an update to the PDN type. In this respect, the term "IP address" herein is intended to cover e.g. an IPv6 prefix and suchlike.

In both cases (A) and (B), the indication (or combined indication) is that the PDN connection is to be established in a manner which will enable it to support the first IP version (based on the fact that the triggering message is associated with the first IP version) and (perhaps later) the second version of the Internet Protocol, with allocation initially by the 3GPP gateway node of an IP address of the first version but not the second version.

The PDN connection request is accepted by the 3GPP network. The 3GPP gateway node (e.g. PGW) allocates to the UE an IP address of the first version and sends it in a response message to the non-3GPP gateway node (e.g. BNG). In the same or different message, the 3GPP gateway node (e.g. PGW) also indicates whether or not the request for postponed/later allocation of an IP address of the second version has been allowed.

Then the non-3GPP gateway node (e.g. BNG) completes the tunnel setup procedure and sends the UE a triggering response message associated with the first IP version, including the allocated IP address of the first version.

After the PDN connection setup procedure is completed, if the UE would like to request an additional address of the second version for the same PDN connection, it sends a triggering message associated with the second IP version (e.g. DHCPv4 where the second IP version is IPv4, or an RS message where the second IP version is IPv6) to the non-3GPP gateway node (e.g. BNG). The non-3GPP gateway node (e.g. BNG) updates the 3GPP gateway node (e.g. PGW) with an address requesting or updating indicator associated with the second IP version. The 3GPP gateway node (e.g. PGW) then assigns a new IP address of the second version to the UE in the response message. The 3GPP gateway node (e.g. BNG) then forwards the allocated IP address of the second version to the non-3GPP gateway node (e.g. BNG), which in turn forwards it to the UE in a triggering response message (e.g. RA message or DHCPv4 ack message).

In summary, a method is proposed which relates to setting up a Packet Data Network, PDN, connection between a User Equipment, UE, and a PDN, with the UE connecting to the PDN via a non-3GPP access network and a 3GPP network. A gateway node in the non-3GPP access network (non-3GPP gateway node) receives a first trigger message to trigger establishment for the PDN connection of a tunnel between the non-3GPP gateway node and a gateway node in the 3GPP network (3GPP gateway node). The non-3GPP gateway node initiates a procedure to establish the tunnel. The non-3GPP gateway node sends a message to the 3GPP gateway node including an indication that the PDN connection is to support the first and a second version of the Internet Protocol, with allocation initially by the 3GPP gateway node of an IP address for the PDN connection of the first version but not the second version. The non-3GPP gateway node receives from the 3GPP gateway node the first version IP address allocated by the 3GPP gateway node for the PDN connection. Following establishment of the PDN connection based on the allocated first version IP address, the non-3GPP gateway node receives a second trigger message relating to the PDN to trigger allocation of an IP address for the PDN connection of the second version. The non-3GPP gateway node sends a message to the 3GPP gateway node to request the allocation of an IP address for the PDN connection of the second version and, if necessary, the updating of the existing PDN connection. The non-3GPP gateway node receives from the 3GPP gateway node the second version IP address allocated by the 3GPP gateway node for the PDN connection.

The message sent to the 3GPP gateway node including the indication may be sent as part of the procedure to establish the tunnel.

The first trigger message may be associated with the first version of the IP.

The first trigger message may be received from the UE.

The first trigger message may be one to trigger establishment of the PDN connection.

The first trigger message may be received from an authentication node of the non-3GPP network following authentication of the UE with the 3GPP network.

The indication in the message sent to the 3GPP gateway node may produced without reference to any explicit request included within the first trigger message that the PDN connection is to support the first and second versions of the IP and/or without reference to any explicit request included within the first trigger message for allocation initially by the 3GPP gateway node of an IP address for the PDN connection of the first version but not the second version.

The indication in the message sent to the 3GPP gateway node for allocation initially by the 3GPP gateway node of an IP address for the PDN connection of the first version but not the second version may be produced based on the association of the first trigger message with the first version of the IP.

The first trigger message may comprise an explicit request that the PDN connection is to support the first and second versions of the IP, but no explicit request for allocation initially by the 3GPP gateway node of an IP address for the PDN connection of the first version but not the second version.

The second trigger message may be associated with the second version of the IP, thereby triggering allocation of an IP address for the PDN connection of the second version.

The second trigger message may be received from the UE.

There is also proposed a method, performed at a gateway node in a 3GPP network, of setting up a Packet Data Network, PDN, connection between a User Equipment, UE, and a PDN, with the UE connecting to the PDN via a non-3GPP access network and the 3GPP network. The 3GPP gateway node initiates establishment for the PDN connection of a tunnel between a gateway node in the non-3GPP network and the 3GPP gateway node. The 3GPP gateway node receives a message from the non-3GPP gateway node including an indication that the PDN connection is to support the first and a second version of the Internet Protocol, with allocation initially by the 3GPP gateway node of an IP address for the PDN connection of the first version but not the second version. The 3GPP gateway node allocates an IP address of the first version for the PDN connection. The 3GPP gateway node sends the first version IP address to the non-3GPP gateway node. Following establishment of the PDN connection based on the allocated first version IP address, the 3GPP gateway node receives a message from the non-3GPP gateway node requesting the allocation of an IP address for the PDN connection of the second version and, if necessary, the updating of the existing PDN connection. The 3GPP gateway node allocates an IP address of the second version for the PDN connection. If necessary, the 3GPP gateway node updates the existing PDN connection to accommodate or support the second version IP address. The 3GPP gateway node sends the allocated second version IP address to the non-3GPP gateway node.

In the above-proposed methods, the non-3GPP access network may be a BroadBand Forum, BBF, network.

In the above-proposed methods, the non-3GPP gateway node may be a Border Network Gateway node of the BBF network.

In the above-proposed methods, the non-3GPP access network may be an access network defined by the WiFi Alliance.

In the above-proposed methods, the non-3GPP access network may form part of a 3GPP access network.

In the above-proposed methods, the 3GPP gateway node may be a PDN Gateway node of the 3GPP core network.

In the above-proposed methods, the first version of the Internet Protocol may be one of IPv4 and IPv6 and the second version of the Internet Protocol may be the other of IPv4 and IPv6.

In the case of IPv6, the IP address may be or comprise an IPv6 prefix.

A gateway node is also proposed for use in a non-3GPP access network for setting up a Packet Data Network, PDN, connection between a User Equipment, UE, and a PDN, with the UE connecting to the PDN via the non-3GPP access network and a 3GPP network. The gateway node comprises a receiver, a controller, and a transmitter. The receiver is arranged to receive a message to trigger establishment for the PDN connection of a tunnel between the non-3GPP gateway node and a gateway node in the 3GPP network. The controller is arranged to initiate a procedure to establish the tunnel. The transmitter is arranged to send a message to the 3GPP gateway node including an indication that the PDN connection is to support the first and a second version of the Internet Protocol, with allocation initially by the 3GPP gateway node of an IP address for the PDN connection of the first version but not the second version. The receiver is arranged to receive from the 3GPP gateway node the first version IP address allocated by the 3GPP gateway node for the PDN connection. The receiver is arranged, following establishment of the PDN connection based on the allocated first version IP address, to receive a message relating to the PDN to trigger allocation of an IP address for the PDN connection of the second version. The transmitter is arranged to send a message to the 3GPP gateway node to request the allocation of an IP address for the PDN connection of the second version and, if necessary, to update of the existing PDN connection. The receiver is arranged to receive from the 3GPP gateway node the second version IP address allocated by the 3GPP gateway node for the PDN connection.

A gateway node is also proposed for use in a 3GPP network for setting up a Packet Data Network, PDN, connection between a User Equipment, UE, and a PDN, with the UE connecting to the PDN via a non-3GPP access network and the 3GPP network. The gateway node comprises a receiver, a controller, and a transmitter. The controller is arranged to initiate establishment for the PDN connection of a tunnel between a gateway node in the non-3GPP network and the 3GPP gateway node. The receiver is arranged to receive a message from the non-3GPP gateway node including an indication that the PDN connection is to support the first and a second version of the Internet Protocol, with allocation initially by the 3GPP gateway node of an IP address for the PDN connection of the first version but not the second version. The controller is arranged to allocate an IP address of the first version for the PDN connection. The transmitter is arranged to send the first version IP address to the non-3GPP gateway node. The receiver is arranged, following establishment of the PDN connection based on the allocated first version IP address, to receive a message from the non-3GPP gateway node requesting the allocation of an IP address for the PDN connection of the second version and, if necessary, the updating of the existing PDN connection. The controller is arranged to allocate an IP address of the second version for the PDN connection. The controller is arranged, if necessary, to update the existing PDN connection to accommodate or support the second version IP address. The transmitter is arranged to send the allocated second version IP address to the non-3GPP gateway node.

Amongst the advantages provided by the proposed scheme are that (a) there are no UE impacts; (b) there are limited network impacts; and (c) there are resource optimizations.

It is to be appreciated that references herein to first and second versions of IP are not intended to limit this technique to only first and second versions of IP. For example, if three versions of IP are supported then references to "first and second" apply to the first and second of those three versions, and so on.

A program is also proposed for controlling an apparatus to perform a method as herein proposed, or which, when loaded into an apparatus, causes the apparatus to become an apparatus as herein proposed. The program may be carried on a carrier medium. The carrier medium may be a storage medium. The carrier medium may be a transmission medium. An apparatus programmed by such a program is also envisaged, as is a storage medium containing such a program.

BRIEF DESCRIPTION OF THE DRAWINGS

FIG. 1, discussed hereinbefore, is a schematic illustration of network entities and paths in the Fixed Mobile Convergence (FMC) specification for enabling broadband users to access PDNs via an EPC network;

FIG. 6 illustrates a GTP postponed address allocation IE;

FIG. 7 illustrates a PMIP postponed address allocation IE;

FIG. 8 illustrates a postponed address allocation value;

FIG. 9 illustrates a GTP PDN type updating IE;

FIG. 10 illustrates a PMIP PDN type Updating IE;

FIG. 11 illustrates a PDN type updating value;

DETAILED DESCRIPTION

Figure 2A:
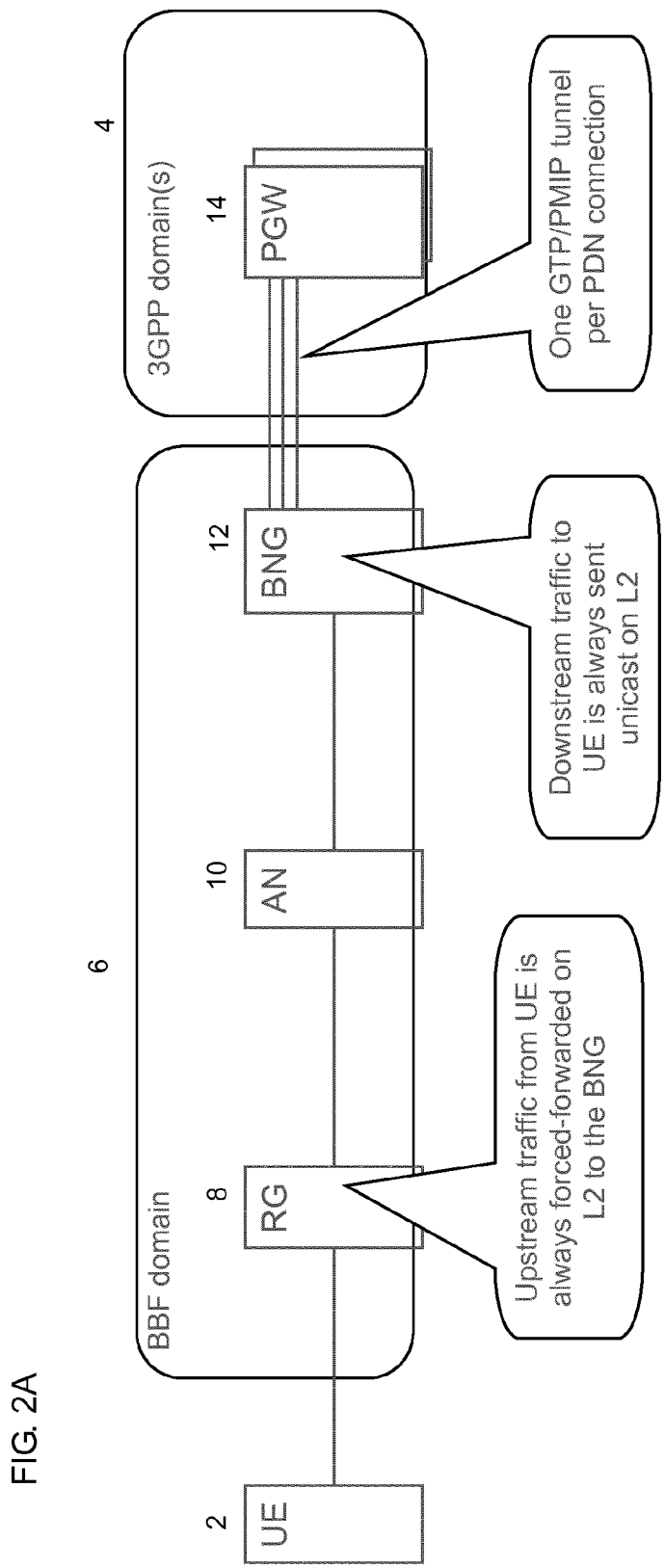
FIG. 2A, discussed hereinbefore, illustrates a possible implementation of a point-to-point link between a UE and a BNG.

As noted earlier, the present applicant has appreciated the following issues with previously-considered approaches to connecting a UE to the EPC.

The current assumption is that when a 3GPP UE attaches to the EPC over a BBF access, it sends an IPv4 triggering message (e.g. DHCPv4) or an IPv6 triggering message (e.g. DHCPv6) to the BNG. (DHCP is the Dynamic Host Configuration Protocol.) Then the BNG initiates the tunnel setup procedure by using GTPv2 (GPRS Tunneling Protocol, v2) or PMIPv6 (Proxy Mobile IPv6) signaling towards the PGW.

At the setup of the GTPv2/PMIPv6 tunnel to the PGW, the BNG indicates the PDN type: IPv4-only, IPv6 only, or IPv4v6. Due to the limitation of the WiFi access protocols, without modifications to the UE the UE is not able to indicate the IP capability it has (UE modifications may not be considered to be acceptable in certain scenarios). Therefore the BNG has to assume either a single IP type PDN connection type (e.g. IPv4only or IPv6only) or a dual IP type PDN connection type (i.e. IPv4v6) at tunnel establishment (or the BNG can base the decision on information received from the 3GPP domain at UE authentication, as will be described further below).

If there is a mismatch between the UE IP capability and the network assumption, extra resources may be allocated unnecessary.

For example, if the UE is only IPv6 capable, but the BNG has requested IPv4v6 PDN connection for the UE, the PGW has to allocate one IPv6 prefix and one IPv4 address to the UE. As the UE is only IPv6 capable, the allocated IPv4 address will never be used, and the operator may have a limited IPv4 address resource.

Another example is where the UE is IPv4 and IPv6 capable, but the BNG has requested an IPv6 PDN connection for the UE; the PGW has to allocate only one IPv6 prefix for the UE. Subsequently the UE may request an IPv4 address for the same Access Point Name (APN). The BNG would then have to set up another PDN connection with the EPC as the PDN type cannot be changed. The network has to manage extra PDN connections for the UE which is also wasting network resources.

Even if a dual IP type PDN connection type is requested, there may be allocation of unnecessary resources if only one part of the dual IP capability is ever used.

In view of these technical problems associated with previously-considered approaches, an embodiment of the present invention proposes a mechanism in which either a dual stack PDN type (e.g. IPv4v6) is allocated at initial PDN connection setup, or the PDN connection type is updated if an additional IP address allocation request is received from the same UE for the same APN.

Within this context, three alternative scenarios will be discussed in turn:
(1) Postponed IPv4 address allocation
(2) Postponed IPv6 address allocation
(3) Updating the PDN type Concerning the first alternative mentioned above ("Postponed IPv4 address allocation"), once the UE attached to a WiFi network, after access authentication is accepted, the UE may send an IPv6 triggering message (e.g. RS message). Upon receiving the IPv6 triggering message, the BNG initiates the tunnel setup procedure with the PGW.

At tunnel setup procedure, either GTP or PMIP, the BNG indicates that PDN type IPv4v6 is requested. In the same message the BNG also indicates that the postponed IPv4 address allocation is requested.

Once the PDN connection request is accepted by the EPC, the PGW allocates only one IPv6 prefix to the UE and send it in the response message to the BNG. In the same message, the PGW also indicates that the postponed IPv4 address allocation is allowed. Or the PGW may indicate that postponed IPv4 address allocation is not allowed.

Then the BNG completes the tunnel setup procedure and send the UE an IPv6 triggering response message (e.g. RA) which contains the allocated IPv6 prefix.

After the PDN connection setup procedure is completed, if the UE would like to request an additional IPv4 address for the same PDN connection, it may send a DHCPv4 message to the BNG. The BNG updates the PGW with IPv4 address requesting indicator. The PGW then assign a new IPv4 address to the UE in the response message. The BNG then forwards the allocated IPv4 address to the UE by using the DHCPv4 procedure.

The BNG may act as a DHCPv4 proxy and forward the DHCPv4 request to the PGW. Then the PGW will responds with the allocated IPv4 address to the UE by using the DHCPv4 procedure.

Concerning the second alternative mentioned above ("Postponed IPv6 prefix allocation"), once the UE attached to a WiFi network, after access authentication is accepted, the UE may send an IPv4 triggering message (e.g. DHCPv4 request message). Upon receiving the IPv4 triggering message, the BNG initiates the tunnel setup procedure with the PGW.

At tunnel setup procedure, either GTP or PMIP, the BNG indicates that PDN type IPv4v6 is requested. In the same message the BNG also indicates that the postponed IPv6 address allocation is requested.

Once the PDN connection request is accepted by the EPC, the PGW allocates only one IPv4 address to the UE and send it in the response message to the BNG. In the same message, the PGW also indicates that the postponed IPv6 address allocation is allowed. Or the PGW may indicate that postponed IPv6 address allocation is not allowed.

Then the BNG completes the tunnel setup procedure and send the UE an IPv4 triggering response message (e.g. DHCPv4 ack) which contains the allocated IPv4 address.

After the PDN connection setup procedure is completed, if the UE would like to request an additional IPv6 prefix for the same PDN connection, it may send an IPv6 triggering message (e.g. RS message) to the BNG. The BNG updates the PGW with IPv6 prefix requesting indicator. The PGW then assign a new IPv6 prefix to the UE in the response message. The BNG then forwards the allocated IPv6 prefix to the UE in the IPv6 triggering response message (e.g. RA message).

Concerning the third alternative mentioned above ("Updating the PDN type"), once the UE attached to a WiFi network, after access authentication is accepted, the UE may send an IPv4 or IPv6 triggering message (e.g. DHCPv4 request message or RS message). Upon receiving the triggering message, the BNG initiates the tunnel setup procedure with the PGW.

At tunnel setup procedure, either GTP or PMIP, the BNG indicates that PDN type IPv4 or IPv6 is requested. In the same message, the BNG also indicates that PDN type Updating may be requested.

Once the PDN connection request is accepted by the EPC, the PGW allocates only one IPv4 address or one IPv6 prefix to the UE and send it in the response message to the BNG. In the same message, the PGW also indicates that PDN type Updating is allowed. Or the PGW may indicate that PDN type updating is not allowed.

Then the BNG completes the tunnel setup procedure and send the UE a triggering response message (e.g. DHCPv4 ack or RA message) which contains the allocated IPv4 address or the IPv6 prefix.

After the PDN connection setup procedure is completed, if the UE would like to request an additional IPv6 prefix or IPv4 address for the same PDN connection, it may send an IPv6 or IPv4 triggering message (e.g. RS message or DHCPv4 request message) to the BNG. The BNG updates the PGW with PDN type updating indicator which contains an additional IPv6 prefix or IPv4 address request. The PGW then assign a new IPv6 prefix or IPv4 address to the UE in the response message. The BNG then forwards the allocated IPv6 prefix or IPv4 address to the UE in the triggering response message (e.g. RA message or DHCPv4 ack message).

The impact of implementing the above-mentioned scheme on existing protocols will now be considered.

With the "Postponed IPv4 address allocation" and "Postponed IPv6 prefix allocation" scenarios, the impact is as follows:

The impact on the protocol is that a new IE has to be specified in both GTP and PMIP. The example of the protocol impacts are described in FIGS. 6 to 8.

The impact on the BNG is that the BNG has to generate the "Postponed IPv6 address allocation" IE at PDN connection establishment procedure.

There is no UE impact.

With the "Updating the PDN type" scenario, the impact is as follows:

The impact on the protocol is that a new IE has to be specified in both GTP and PMIP. The example of the protocol impacts are described in FIGS. 9 to 11.

The impact on the BNG is that the BNG has to generate the "PDN type updating" IE at PDN connection updating procedure.

There is no UE impact.

Figure 2B:
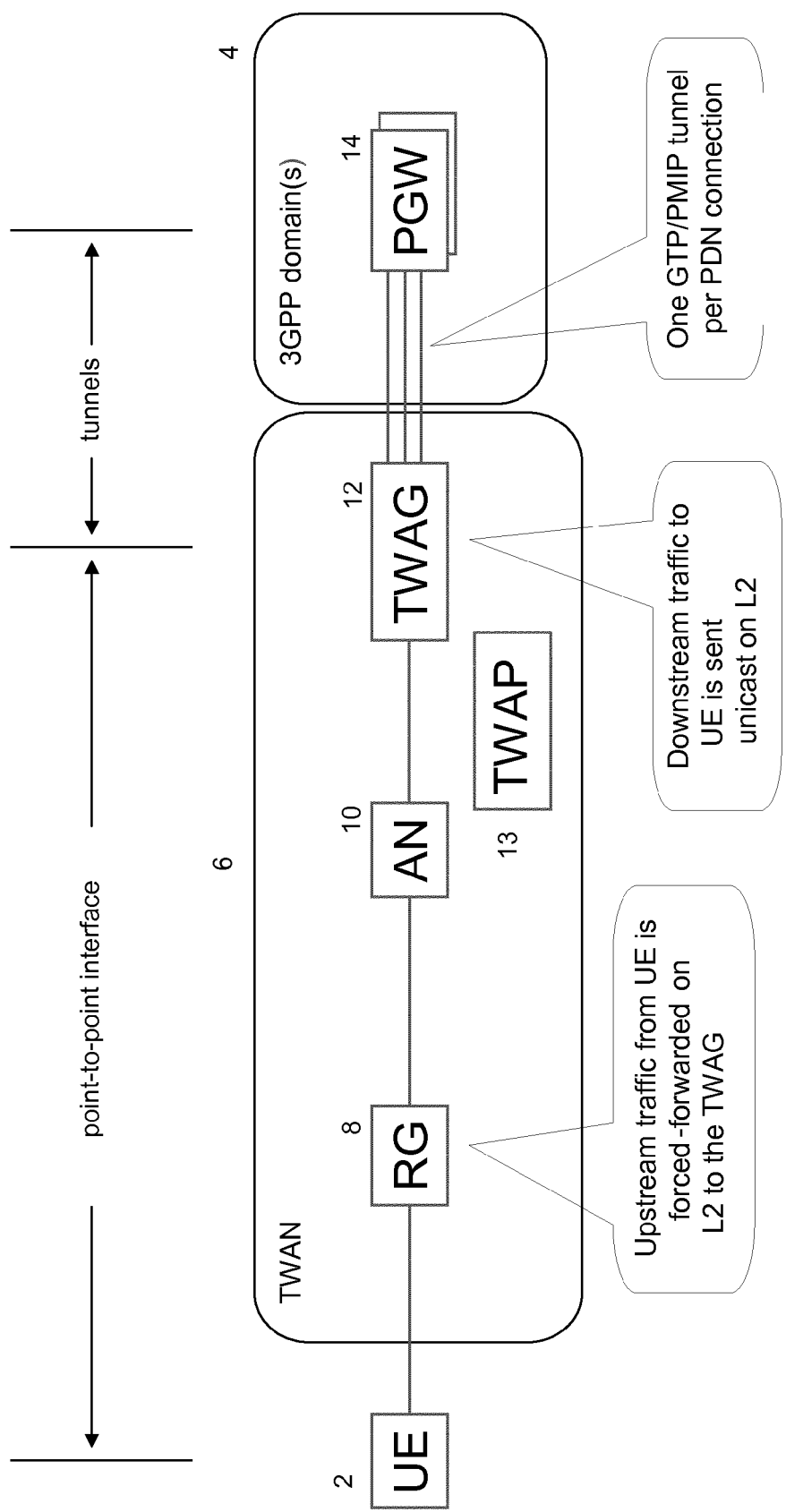
FIG. 2B, discussed hereinbefore, is a schematic block diagram providing an architecture overview in which point-to-point links are provided between UE and TWAG, and tunnels between TWAG and PGW.

Using the terminology introduced with reference to FIG. 2B, in the above description it is assumed that the UE 2 sends a trigger to the TWAG 12 by means of DHCPv4 (for IPv4) or by means of RS (for IPv6), or both. An alternative to RS would be DHCPv6 or ND (Neighbour Discovery). If the TWAG 12 receives an IPv4 trigger, it is reasoned that the TWAG 12 would setup an IPv4 tunnel with deferred IPv6 allocation, and vice versa for an IPv6 trigger.

The present invention is also applicable in a scenario in which there is no direct UE-to-TWAG trigger message (e.g. for IPv6 specifically), but instead in which successful authentication serves as the trigger. Note that a UE 2 always authenticates first. Only after authentication, the UE 2 can start to send DHCPv4 or RS messages.

Authentication is between the UE 2 and the 3GPP domain 4. Authentication passes the Trusted WLAN Access Point (TWAP) 13, but does not necessarily pass the TWAG 12. In other words, if authentication is to serve as a trigger for tunnel setup, the TWAP 13 would send a signal to the TWAG 12 after successful authentication. The TWAG 12 can then set up the tunnel.

For IPv6, the procedure could then be:
(a) The UE 2 starts the authentication process;
(b) The TWAP 13 receives successful authentication from the 3GPP domain 4;
(c) The TWAP 13 informs the TWAG 12 of successful authentication;
(d) The TWAG 12 sets up the tunnel;
(e) The TWAG 12 informs the TWAP 13 of successful tunnel setup;
(f) The TWAP 13 informs the UE 2 of successful authentication;
(g) The TWAG 12 sends a RA message to the UE 2 containing the IPv6 prefix received from 3GPP domain 4 at tunnel setup.

Although there is no direct trigger from the UE 2 to the TWAG 12 in the above procedure, the message sent from the TWAP 13 to the TWAG 12 in step (c) above can be considered to be a trigger message: just as in the previous examples it is a message to trigger establishment for the PDN connection of a tunnel between the TWAG 12 and the PGW 14 in the 3GPP network 4. The trigger message in this example comes from the TWAP 13 rather than the UE 2, but is still of course received by the TWAG 12 and it is still a trigger message. After the TWAG 12 has set up the tunnel, the allocated IPv6 prefix can be sent from the TWAG 12 to the UE 2; the TWAG 12 does not need to wait on any signal (e.g. RS) from the UE 2. Sending of the prefix can be performed by an RA (Router Advertisement); this is the standard IPv6 method.

For IPv4, the procedure will be slightly different. There is no RA mechanism in IPv4. Typically the only way to get an address from the network to the UE is DHCPv4. So, the procedure could become:
(a) The UE 2 starts the authentication process;
(b) The TWAP 13 receives successful authentication from the 3GPP domain 4;
(c) The TWAP 13 informs the TWAG 12 of successful authentication;
(d) The TWAG 12 sets up the tunnel;
(e) The TWAG 12 informs the TWAP 13 of successful tunnel setup;
(f) The TWAP 13 informs the UE 2 of successful authentication;
(g) The UE 2 sends a DHCPv4 message to the TWAG 12;
(h) The TWAG 12 replies with a DHCPv4 message including the IP address received from the 3GPP domain 4 at tunnel setup.

A variant of the procedure in the case of IPv4 is as follows:
(a) The UE 2 starts the authentication process;
(b) The TWAP 13 receives successful authentication from the 3GPP domain 4;
(c) The TWAP 13 informs the UE 2 of successful authentication;
(d) The UE 2 sends a DHCPv4 message to the TWAG 12;
(e) The TWAG 12 sets up the tunnel;
(f) The TWAG 12 replies with a DHCPv4 message having the IP address received from 3GPP domain 4 at tunnel setup.

This is a slight reordering of the previously-described procedure; the difference is that no TWAP to TWAG signaling is needed. DHCPv4 is the trigger for tunnel setup, not authentication.

It has been described further above that the trigger sent from the UE 2 to the TWAG 12 includes an indication of or is associated with the IP version. In this respect, if the TWAG 12 receives an IPv4 trigger, it is reasoned that the TWAG 12 would set up an IPv4 tunnel with deferred IPv6 allocation, and vice versa for an IPv6 trigger. However, authentication is not associated with any IP version, and there is no direct trigger sent from the UE 2 to the TWAG 12.

There is therefore an issue as to how the TWAG 12 comes to know when to set up an IPv4, an IPv6 or an IPv4v6 tunnel ("PDN Type"). One possibility is that the PDN Type is set based on the user profile that the TWAP 13 received from the 3GPP domain 4 at authentication. In particular, a PDN connection is set up towards a PDN (a network) that is identified by an APN (the name of that network). The user profile indicates to which APNs the UE 2 is authorized, and for which PDN Type. For example, if the UE 2 wishes to attach to its default APN, and the user profile states IPv4v6 for that APN, then the TWAG 12 will set up an IPv4v6 tunnel.

A possible implementation in the context of the present invention, and assuming authentication as the trigger, could be as follows.

If the PDN Type is IPv4v6, then an IPv6 tunnel is set up with deferred allocation for (or update to) IPv4. DHCPv4 from the UE 2 to the TWAG 12 would still be the trigger for adding IPv4 at a later time.

The opposite is also possible, i.e. set up an IPv4 tunnel, and let the TWAG 12 wait for an explicit IPv6 trigger from the UE 2. However, this may no be supported in the spec.

Although there is are example implementations where there is no direct trigger message sent from the UE 2 to the TWAG 12 (for example in the case of authentication being the trigger), it can be considered in these implementations that there is an intermediate step of the non-3GPP network (TWAN) 6 receiving a trigger message from the UE 2, associating the trigger message with a particular IP version, and sending a derived trigger message to the TWAG 12 that is associated with the IP version, which in turn is used at the TWAG 12 to establish a tunnel and request an appropriate IP address for the PDN connection from the PGW 14; this is functionally equivalent to the previous description.

The various scenarios above can be each be considered to fall within the following more general summary of an embodiment of the present invention.

An embodiment of the present invention provides a means of establishing a PDN connection between a UE and a PDN in a context where the UE attaches to a non-3GPP access network and connects to the PDN via a 3GPP network. A tunnel associated with the PDN connection is established between the non-3GPP access network and the 3GPP network.

Figure 3:
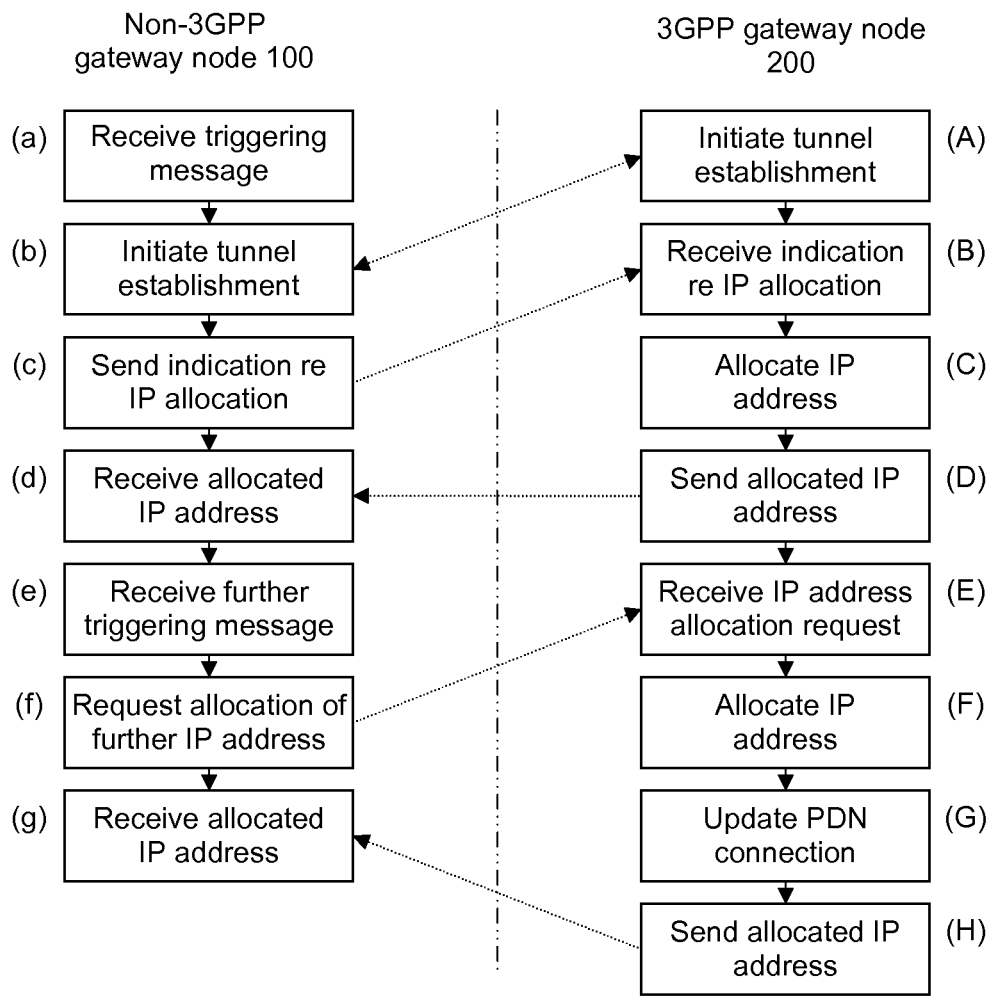
FIG. 3 is a flowchart illustrating schematically a method performed according to an embodiment of the present invention.
Figure 4:
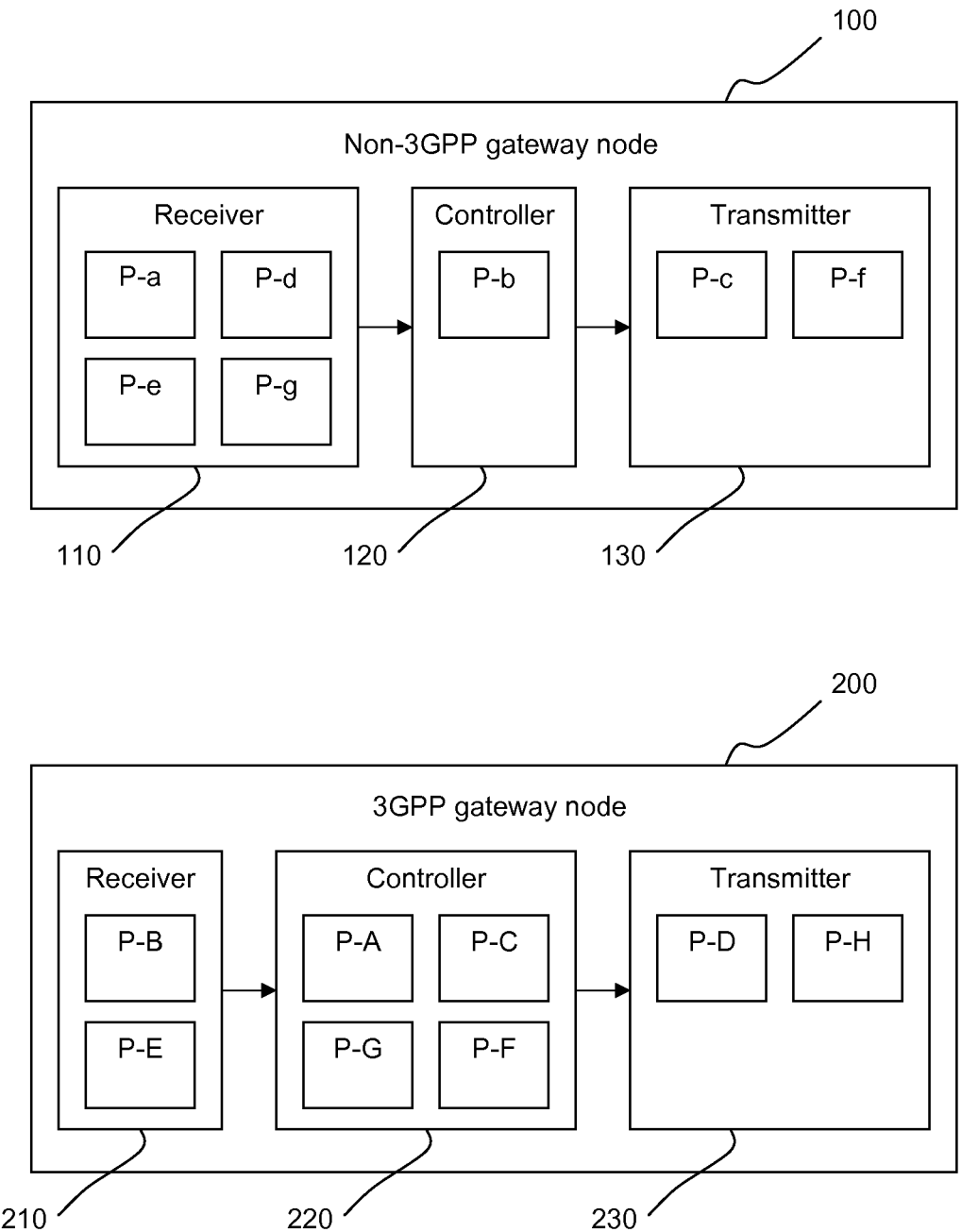
FIG. 4 is a schematic block diagram illustrating apparatus according to an embodiment of the present invention.

With that background in mind, an embodiment of the present invention will now be described with reference to the schematic flowchart of FIG. 3 and the schematic apparatus diagram of FIG. 4. FIG. 3 illustrates the steps performed by the non-3GPP access node 100 and by the 3GPP gateway node 200, while FIG. 4 illustrates parts or components or processors or transmitter/receivers of the non-3GPP gateway node 100 and the 3GPP gateway node 200 for performing the steps illustrated in FIG. 3.

The steps performed at the non-3GPP gateway node 100 (i.e. the gateway node in the non-3GPP access network) will be described first.

In step (a), a trigger message is received at a component P-a of a receiver 110. The trigger message is of a type to trigger establishment for the PDN connection of a tunnel between the non-3GPP gateway node 100 and the 3GPP gateway node 200.

In step (b), a procedure is initiated by a component P-b of a controller 120 to establish the tunnel for (to be associated with) the PDN connection. The tunnel is established between the non-3GPP gateway node 100 and the gateway node 200 in the 3GPP network.

In step (c), an indication is sent to the 3GPP gateway node 200 from a component P-c of a transmitter 130, in one or more messages, that the PDN connection is to be established in a manner which will enable it to support the first and a second version of the Internet Protocol, with allocation initially by the 3GPP gateway node 200 of an IP address of the first version but not the second version.

In step (d), the first version IP address allocated by the 3GPP gateway node 200 is received from the 3GPP gateway node 200 at a component P-d of the receiver 110.

In step (e), a further trigger message is received at a component P-e of the receiver 110, relating to the same PDN. The trigger message is of a type to trigger allocation of an IP address for the PDN connection of the second version, an IP address for the PDN connection of the first version having already been allocated as a result of step (c).

In step (f), a message is sent from a component P-f of the transmitter 130 to the 3GPP gateway node 200 to request the allocation of an IP address of the second version and, if necessary, the updating of the existing PDN connection.

In step (g), the second version IP address allocated by the 3GPP gateway node 200 is received from the 3GPP gateway node 200 at a component P-g of the receiver 110.

The steps performed at the 3GPP gateway node 200 (i.e. the gateway node in the 3GPP network) will now be described.

In step (A), establishment is initiated, by a component P-A of a controller 220, of the tunnel to be associated with the PDN connection.

In step (B), an indication is received from the non-3GPP gateway node 100 at a component P-B of a receiver 210. The indication is that the PDN connection is to be established in a manner which will enable it to support the first and versions of the Internet Protocol, with allocation initially by the 3GPP gateway node of an IP address of the first version but not the second version.

In step (C), the first version IP address is allocated by a component P-C of the controller 220.

In step (D), the first version IP address is sent to the non-3GPP gateway node 100 from a component P-D of a transmitter 230.

In step (E), a message is received from the non-3GPP gateway node 100 at a component P-E of the receiver 210. The message is requesting the allocation of an IP address of the second version and, if necessary, the updating of the existing PDN connection.

In step (F), an IP address of the second version is allocated as requested by a component P-F of the controller 220.

In step (G), the existing PDN connection is updated, if necessary, to accommodate or support the second version IP address. This is performed by a component P-G of the controller 220.

In step (H), the allocated second version IP address is sent to the non-3GPP gateway node 100 from a component P-H of the transmitter 230.

It will be appreciated that operation of one or more of the above-described components can be provided in the form of one or more processors or processing units, which processing unit or units could be controlled or provided at least in part by a program operating on the device or apparatus. The function of several depicted components may in fact be performed by a single component. A single processor or processing unit may be arranged to perform the function of multiple components. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

Figure 5:
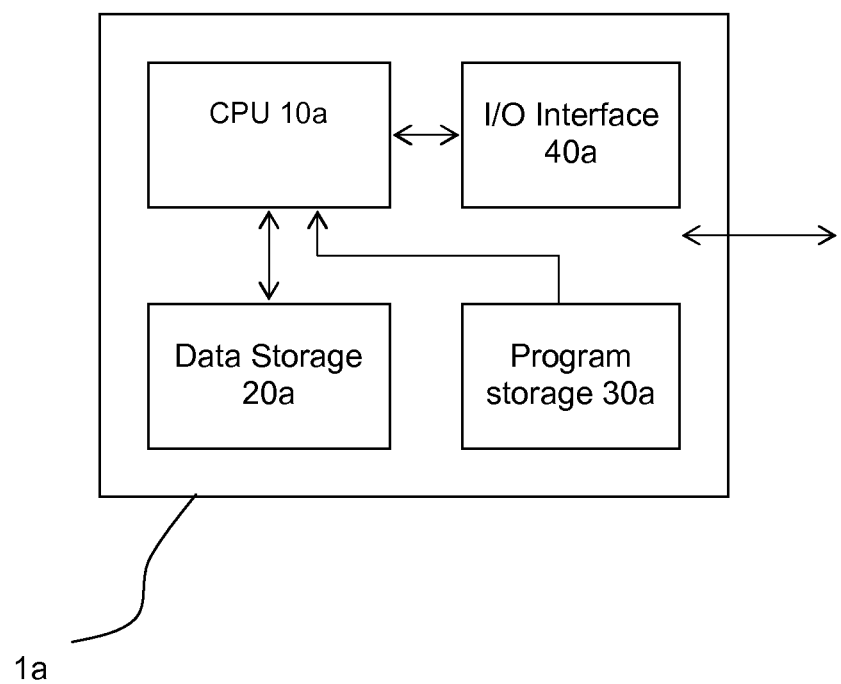
FIG. 5 is a schematic illustration of a node in which a method embodying the present invention can be implemented.

FIG. 5 is a schematic illustration of a node 1a in which a method embodying the present invention can be implemented. A computer program for controlling the node 1a to carry out a method embodying the present invention is stored in a program storage 30a. Data used during the performance of a method embodying the present invention is stored in a data storage 20a. During performance of a method embodying the present invention, program steps are fetched from the program storage 30a and executed by a Central Processing Unit (CPU) 10a, retrieving data as required from the data storage 20a. Output information resulting from performance of a method embodying the present invention can be stored back in the data storage 20a, or sent to an Input/Output (I/O) interface 40a, which may comprise a transmitter for transmitting data to other nodes, as required. Likewise, the Input/Output (I/O) interface 40a may comprise a receiver for receiving data from other nodes, for example for use by the CPU 10a.

It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. Likewise, an embodiment of the present invention is not restricted to a non-3GPP access network such as the BBF, but is applicable to any non-3GPP access network. Therefore, in particular, the terms 3GPP and BBF and associated or related terms used in the above description and in the appended drawings and any appended claims now or in the future are to be interpreted accordingly. In particular, an embodiment of the present invention is applicable in the context of SaMOG (described above), and the non-3GPP access network described herein is also intended to cover an access defined by the WiFi Alliance (again, described above).

Figure 12:
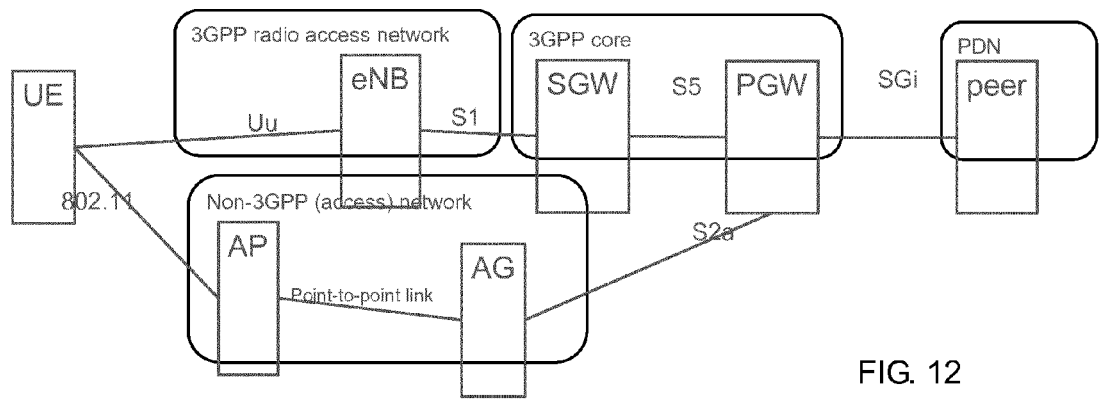
FIG. 12 is a schematic illustration of an architecture having separate 3GPP and non-3GPP access networks.

Furthermore, it is to be appreciated that the FMC work started off with an architecture having a 3GPP core network and a separate non-3GPP access network such as is illustrated in FIG. 12. However, possibilities are now being considered to incorporate WiFi into the 3GPP radio access network, leading to an architecture illustrated in FIGS. 13 and 14.

Figure 13:
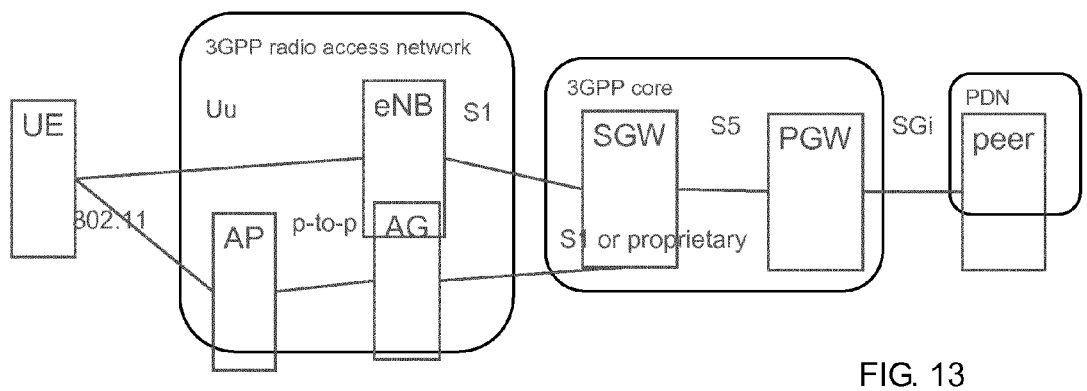
FIG. 13 is a schematic illustration of an alternative architecture in which the non-3GPP access network is incorporated into the 3GPP access network.

In the architecture of FIG. 13, the AG or Access Gateway is now inside the 3GPP RAN. There is still a point-to-point link between the AP and AG, just as in FIG. 12. (Note that network nodes can generally be considered as functional entities, so that they may be split or co-located—e.g. the PGW and SGW may be co-located, the Evolved Node B (eNB) and AG may be co-located, and so on.)

Figure 14:
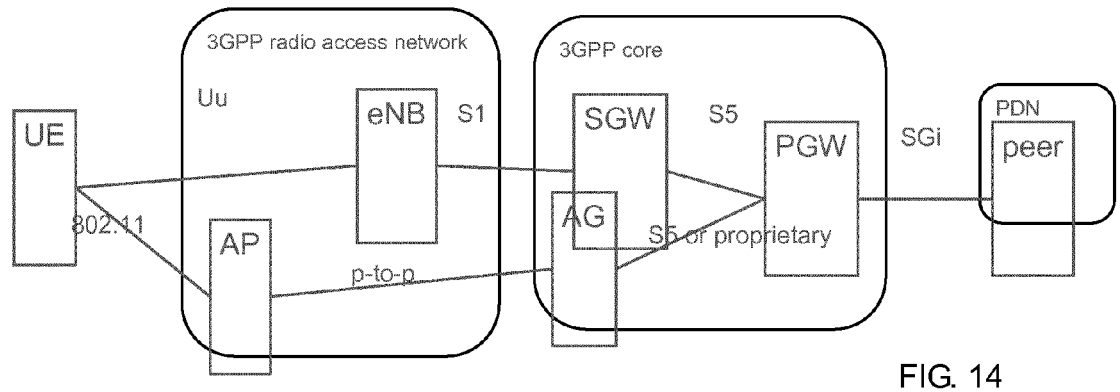
FIG. 14 is a schematic illustration of an alternative architecture in which the non-3GPP access network is incorporated into the 3GPP access network.

In the architecture of FIG. 14, the AG is now inside the 3GPP core. There is still a point-to-point link between AP and AG, just as previously.

It is important to appreciate that the technique disclosed herein is equally applicable to the architectures of FIGS. 13 and 14, and therefore the term "non-3GPP access network" is to be interpreted accordingly, i.e. covering both a separate non-3GPP access network and a non-3GPP access network effectively incorporated into or considered in some sense as being part of the 3GPP access network. The non-3GPP access bypasses the 3GPP access provided by way of the eNB. Likewise, the term "non-3GPP gateway node" used herein is to be interpreted as covering the architecture of FIG. 14. As such, "gateway node in the non-3GPP access network" or "non-3GPP gateway node" can be substituted simply by "gateway node" where appropriate, and "non-3GPP access network" can be substituted simply by "access network" where appropriate.

The invention claimed is:

1. A method of setting up a Packet Data Network (PDN) connection between a User Equipment (UE) and a PDN, with the UE connecting to the PDN via a non-3GPP access network and a 3GPP network, the method comprising at a non-3GPP gateway node in the non-3GPP access network:
   a) receiving a message to trigger establishment, for the PDN connection, of a tunnel between the non-3GPP gateway node and a gateway node in the 3GPP network;
   b) initiating a procedure to establish the tunnel;
   c) sending a message to the 3GPP gateway node including an indication that the PDN connection is to support a first and a second version of Internet Protocol (IP), with allocation initially by the 3GPP gateway node of an IP address for the PDN connection of the first version but not the second version, wherein the sending is irrespective of whether the UE indicates its IP capability over the non-3GPP access network;
   d) receiving, from the 3GPP gateway node, the first version IP address allocated by the 3GPP gateway node for the PDN connection;
   e) following establishment of the PDN connection based on the allocated first version IP address, receiving a message relating to the PDN to trigger allocation of an IP address for the PDN connection of the second version;
   f) sending a message to the 3GPP gateway node to request the allocation of an IP address for the PDN connection of the second version;
   g) receiving, from the 3GPP gateway node, the second version IP address allocated by the 3GPP gateway node for the PDN connection.

2. The method of claim 1, wherein the message sent in step (c) is sent as part of the procedure in step (b) to establish the tunnel.

3. The method of claim 1, wherein the trigger message received in step (a) is associated with the first version of the IP.

4. The method of claim 1, wherein the trigger message received in step (a) is received from the UE.

5. The method of claim 4, wherein the trigger message received in step (a) is a message to trigger establishment of the PDN connection.

6. The method of claim 1, wherein the trigger message received in step (a) is received from an authentication node of the non-3GPP network following authentication of the UE with the 3GPP network.

7. The method of claim 1, wherein the indication in step (c) is produced without reference to any explicit request included within the trigger message received in step (a) that the PDN connection is to support the first and second versions of the IP and/or without reference to any explicit request included within the trigger message for allocation initially by the 3GPP gateway node of an IP address for the PDN connection of the first version but not the second version.

8. The method of claim 7:
   wherein the trigger message received in step (a) is associated with the first version of the IP;
   wherein the indication in step (c) is produced based on the association of the trigger message received in step (a) with the first version of the IP.

9. The method of claim 7, wherein the trigger message received in step (a) comprises an explicit request that the PDN connection is to support the first and second versions of the IP, but no explicit request for allocation initially by the 3GPP gateway node of an IP address for the PDN connection of the first version but not the second version.

10. The method of claim 1, wherein the trigger message received in step (e) is associated with the second version of the IP, thereby triggering allocation of an IP address for the PDN connection of the second version.

11. The method of claim 1, wherein the trigger message received in step (e) is received from the UE.

12. The method of claim 1, wherein the non-3GPP access network is a Broad Band Forum (BBF) network.

13. The method of claim 12, wherein the non-3GPP gateway node is a Border Network Gateway node of the BBF network.

14. The method of claim 1, wherein the non-3GPP access network is an access network defined by WiFi Alliance.

15. The method of claim 1, wherein the non-3GPP access network forms part of a 3GPP access network.

16. The method of claim 1, wherein the 3GPP gateway node is a PDN Gateway node of a 3GPP core network.

17. The method of claim 1, wherein the first version of the IP is one of IPv4 and IPv6 and the second version of the IP is the other of IPv4 and IPv6.

18. The method of claim 17, wherein the IP address for the version corresponding to IPv6 is an IPv6 prefix.

19. A method of setting up a Packet Data Network (PDN) connection between a User Equipment (UE) and a PDN, with the UE connecting to the PDN via a non-3GPP access network and a 3GPP network, the method comprising at a 3GPP gateway node in the 3GPP network:
   initiating establishment, for the PDN connection, of a tunnel between a gateway node in the non-3GPP network and the 3GPP gateway node;
   receiving a message from the non-3GPP gateway node including an indication that the PDN connection is to support a first and a second version of Internet Protocol (IP), with allocation initially by the 3GPP gateway node of an IP address for the PDN connection of the first version but not the second version, wherein the receiving is irrespective of whether the UE indicates its IP capability over the non-3GPP access network;
   allocating an IP address of the first version for the PDN connection;
   sending the first version IP address to the non-3GPP gateway node;
   following establishment of the PDN connection based on the allocated first version IP address, receiving a message from the non-3GPP gateway node requesting the allocation of an IP address for the PDN connection of the second version;
   allocating an IP address of the second version for the PDN connection;
   sending the allocated second version IP address to the non-3GPP gateway node.

20. A non-3GPP gateway node for use in a non-3GPP access network for setting up a Packet Data Network (PDN) connection between a User Equipment (UE) and a PDN, with the UE connecting to the PDN via the non-3GPP access network and a 3GPP network, the non-3GPP gateway node comprising:
   a receiver;
   a controller circuit;
   a transmitter;
   wherein the receiver is configured to receive a message to trigger establishment, for the PDN connection, of a tunnel between the non-3GPP gateway node and a gateway node in the 3GPP network;
   wherein the controller circuit is configured to initiate a procedure to establish the tunnel;
   wherein the transmitter is configured to send a message to the 3GPP gateway node including an indication that the PDN connection is to support a first and a second version of Internet Protocol (IP), with allocation initially by the 3GPP gateway node of an IP address for the PDN connection of the first version but not the second version, wherein the sending is irrespective of whether the UE indicates its IP capability over the non-3GPP access network;
   wherein the receiver is configured to receive, from the 3GPP gateway node, the first version IP address allocated by the 3GPP gateway node for the PDN connection;
   wherein the receiver is configured to, following establishment of the PDN connection based on the allocated first version IP address, receive a message relating to the PDN to trigger allocation of an IP address for the PDN connection of the second version;
   wherein the transmitter is configured to send a message to the 3GPP gateway node to request the allocation of an IP address for the PDN connection of the second version;
   wherein the receiver is configured to receive, from the 3GPP gateway node, the second version IP address allocated by the 3GPP gateway node for the PDN connection.

21. A 3GPP gateway node for use in a 3GPP network for setting up a Packet Data Network (PDN) connection between a User Equipment (UE) and a PDN, with the UE connecting to the PDN via a non-3GPP access network and the 3GPP network, the gateway node comprising:
   a receiver;
   a controller circuit;
   a transmitter;
   wherein the controller circuit is configured to initiate establishment, for the PDN connection, of a tunnel between a gateway node in the non-3GPP network and the 3GPP gateway node;
   wherein the receiver is configured to receive a message from the non-3GPP gateway node including an indication that the PDN connection is to support a first and a second version of Internet Protocol (IP), with allocation initially by the 3GPP gateway node of an IP address for the PDN connection of the first version but not the second version, wherein the receiving is irrespective of whether the UE indicates its IP capability over the non-3GPP access network;
   wherein the controller circuit is configured to allocate an IP address of the first version for the PDN connection;
   wherein the transmitter is configured to send the first version IP address to the non-3GPP gateway node;
   wherein the receiver is configured to, following establishment of the PDN connection based on the allocated first version IP address, receive a message from the non-3GPP gateway node requesting the allocation of an IP address for the PDN connection of the second version;
   wherein the controller circuit is configured to allocate an IP address of the second version for the PDN connection;
   wherein the transmitter is configured to send the allocated second version IP address to the non-3GPP gateway node.

22. A computer program product stored in a non-transitory computer readable medium for setting up a Packet Data Network (PDN) connection between a User Equipment (UE) and a PDN, with the UE connecting to the PDN via a non-3GPP access network and a 3GPP network, the computer program product comprising software instructions which, when run on a non-3GPP gateway node in the non-3GPP access network, causes the non-3GPP gateway node to:
- initiate a procedure to establish, for the PDN connection, a tunnel between the non-3GPP gateway node and a gateway node in the 3GPP network, in response to receiving a message to trigger establishment of the tunnel;
- send a message to the 3GPP gateway node including an indication that the PDN connection is to support a first and a second version of Internet Protocol (IP), with allocation initially by the 3GPP gateway node of an IP address for the PDN connection of the first version but not the second version, wherein the sending is irrespective of whether the UE indicates its IP capability over the non-3GPP access network;
- receive, from the 3GPP gateway node, the first version IP address allocated by the 3GPP gateway node for the PDN connection;
- following establishment of the PDN connection based on the allocated first version IP address, receive a message relating to the PDN to trigger allocation of an IP address for the PDN connection of the second version;
- send a message to the 3GPP gateway node to request the allocation of an IP address for the PDN connection of the second version;
- receive, from the 3GPP gateway node, the second version IP address allocated by the 3GPP gateway node for the PDN connection.

23. A computer program product stored in a non-transitory computer readable medium for setting up a Packet Data Network (PDN) connection between a User Equipment (UE) and a PDN, with the UE connecting to the PDN via a non-3GPP access network and a 3GPP network, the computer program product comprising software instructions which, when run on a 3GPP gateway node in the 3GPP access network, causes the 3GPP gateway node to:
- initiate establishment, for the PDN connection, of a tunnel between a gateway node in the non-3GPP network and the 3GPP gateway node;
- receive a message from the non-3GPP gateway node including an indication that the PDN connection is to support a first and a second version of Internet Protocol (IP), with allocation initially by the 3GPP gateway node of an IP address for the PDN connection of the first version but not the second version, wherein the receiving is irrespective of whether the UE indicates its IP capability over the non-3GPP access network;
- allocate an IP address of the first version for the PDN connection;
- send the first version IP address to the non-3GPP gateway node;
- following establishment of the PDN connection based on the allocated first version IP address, receive a message from the non-3GPP gateway node requesting the allocation of an IP address for the PDN connection of the second version;
- allocate an IP address of the second version for the PDN connection;
- send the allocated second version IP address to the non-3GPP gateway node.

24. The method of claim 1, wherein the UE indicates its IP capability over the non-3GPP access network by indicating the UE's preference for deferred IP address allocation.

\* \* \* \* \*